D. KARAMANOS.
OPERATING MECHANISM FOR EGG BEATERS.
APPLICATION FILED OCT. 25, 1919.
1,362,164.
Patented Dec. 14, 1920.
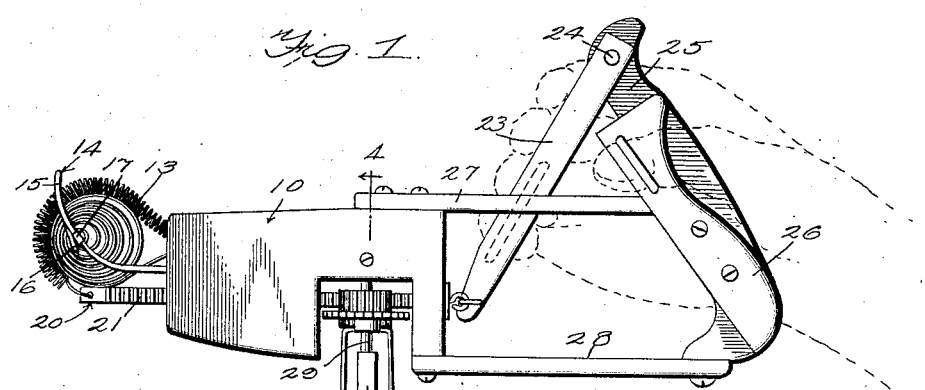
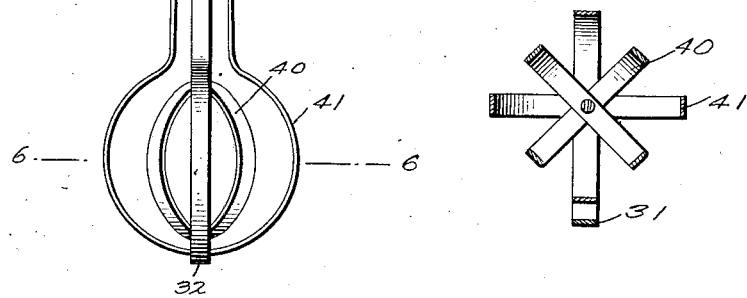
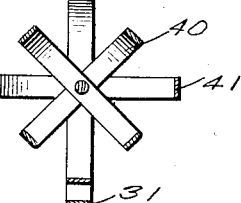
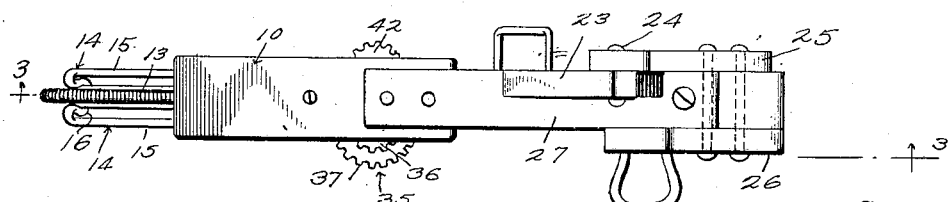
Inventor
Demetrios Karamanos
By
Attorney D. KARAMANOS.
OPERATING MECHANISM FOR EGG BEATERS.
APPLICATION FILED OCT. 25, 1919.
1,362,164.
Patented Dec. 14, 1920.
2 SHEETS—SHEET 2.
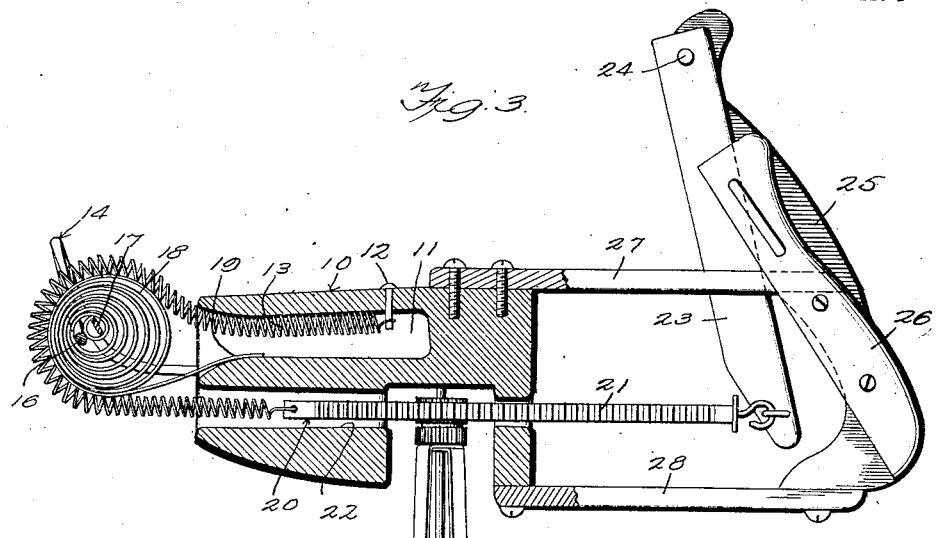
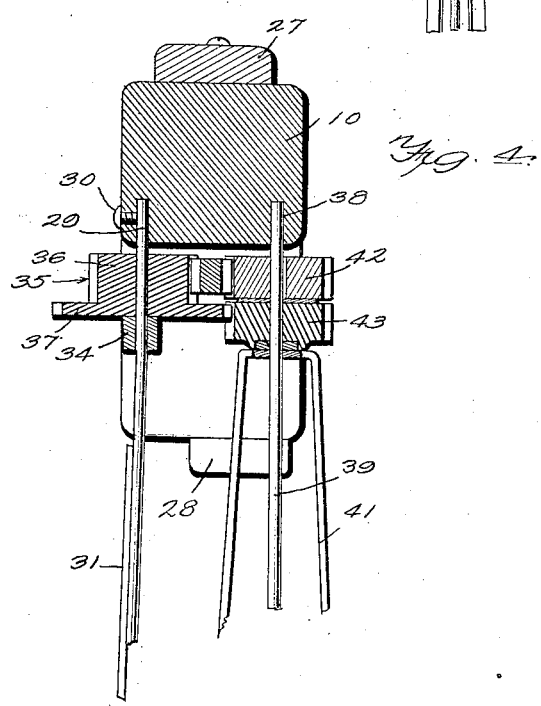
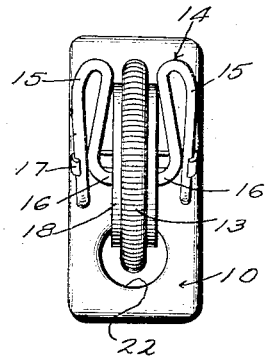
Inventor
Demetrios Karamanos
By
Attorney

UNITED STATES PATENT OFFICE.

DEMETRIOS KARAMANOS, OF DONORA, PENNSYLVANIA.

OPERATING MECHANISM FOR EGG-BEATERS.

1,362,164.  Specification of Letters Patent.  Patented Dec. 14, 1920.

Application filed October 25, 1919. Serial No. 333,270.

*To all whom it may concern:*

Be it known that I, DEMETRIOS KARAMANOS, a subject of the King of Greece, residing at Donora, in the county of Washington and State of Pennsylvania, have invented certain new and useful Improvements in Operating Mechanism for Egg-Beaters, of which the following is a specification.

This invention relates to improvements in operating mechanism for egg beaters, mixers and the like.

An important object of the invention is to provide operating mechanism for egg beaters, mixers and the like, wherein a pair of coaxial members are revolved at different speeds, said operating mechanism comprising a reciprocating rack having teeth on opposite sides, a gear keyed to the shaft of one of the rotating members and meshing with the teeth on one side of the rack, and a second gear loosely mounted on the shaft and secured to the second revolving element together with means for driving said second gear from the opposite side of the rack.

In a copending application, Serial No. 385,028, filed May 28, 1920, which is a division of the present application, I have disclosed and claimed operating mechanism for devices of this character, consisting of means for reciprocating a rack bar. While I have shown the use of such means in the accompanying drawing, this feature does not form a part of the present invention and is claimed in the said copending application.

Other objects and advantages will be apparent throughout the course of the following description.

In the accompanying drawings wherein for the purpose of illustration is shown a preferred embodiment of my invention and wherein like numerals designate like parts throughout, Figure 1 is a side elevation of an egg beater embodying my invention.

Fig. 2 is a top plan view thereof.

Fig. 3 is a section taken on the line 3—3 of Fig. 2.

Fig. 4 is a section taken on a line 4—4 of Fig. 1.

Fig. 5 is an end elevation thereof, and

Fig. 6 is a section taken on the line 6—6 of Fig. 1.

Referring now more particularly to the drawings the numeral 10 indicates a body portion provided with a longitudinal recess 11. A pin 12 extends into the recess 11 and has secured thereto one end of a coiled tension spring 13.

Secured to the body portion 10 in any suitable manner is a combined support and guide 14 formed of a piece of wire bent to form spaced loops 15, the lower inner ends of the loops being connected by means of a transverse portion 16 of the wire. A support 17 is secured to the loop 15 adjacent to the transverse portion 16 connecting the loops. A coiled clock work spring 18 has its inner end secured to the support 17 and its outer or free end 19 extending within the recess 11 and free to move therein. It will be seen that the clock work spring 18 is normally in expanded position and that the recess 11 affords a guide for the free end thereof.

The coiled tension spring 13 extends about the outer coil of the clock work spring 18 and is held in position thereon by the loops 15. The free end of the tension spring 13 is secured to a longitudinally reciprocable member 20 comprising in the present instance a bar provided upon each side thereof with gear teeth 21, forming a double faced rack. The reciprocable member 20 operates within a longitudinal bore 22 formed in the body member 10.

The rear end of the reciprocable member has secured thereto a means for moving the member in one direction, comprising in the present instance a lever 23 to the lower end of which the reciprocable member is pivotally connected. The upper end of the lever 23 is pivoted as at 24 to a bracket 25 which bracket is in turn secured to a handle 26. This handle 26 is spaced from the body portion by means of arms 27 and 28 secured to the upper and lower faces of the body portion respectively, and to the handle 26. It will be seen that if the lever 23 is moved toward the handle the tension spring 13 is drawn about the clock work spring 18 and the clock work spring is compressed. This action gives a very smooth and even action of the spring 13 and also increases the amount of pull exerted to return the reciprocable member to its normal position.

A shaft 29 is provided, secured against rotation by means of screw 30. To the lower end of this shaft is secured, by means of soldering, welding or the like, a flat portion 31 which is provided at its lower end with an approximately horizontal portion 32 forming a support. A collar 34 is secured to the shaft 29 and has mounted upon its upper face a member 35 rotatable upon the shaft 29. This member 35 embodies a gear 36 meshing with one side of the rack and a gear 37 formed integrally with or secured to the gear 36 and of a larger diameter. A shaft 39 is suitably journaled in the body portion 10, as at 38, to permit rotation of the shaft. The inner beater element 40 is mounted on this shaft and revolves therewith. An outer beater element 41 is arranged coaxially with the inner beater element and is loosely mounted on the shaft. The inner beater element is revolved by means of a gear 42 keyed to the shaft 39 and meshing with the teeth 21 on one side of the rack. A gear 43 is loosely mounted on shaft 39 and is secured to the outer beater element. This gear meshes with the gear 37, driving the outer beater element, but at a greater speed.

As many changes are possible in the shape, size, and arrangement of the various parts shown, without in any manner departing from the spirit of the invention, I do not limit myself to the specific construction or application of my invention herein shown, but may make any such changes without departing from the spirit of the invention or the scope of the subjoined claims.

What I claim is:

1. A drive mechanism comprising a reciprocating rack having teeth on opposite sides, and a pair of elements to be driven, one of said elements including a shaft and a pinion mounted on the shaft and meshing with one side of the rack, the other element being free to rotate on said shaft and coaxial therewith, a pinion carried by said second element, a gear meshing with said pinion, said gear being mounted on a suitable support, a second gear carried thereby, and meshing with the opposite side of the rack.

2. A drive mechanism comprising a reciprocating rack and a pair of elements to be driven, one of said elements including a shaft, a pinion mounted on the shaft and meshing with one side of the rack, the other element being free to rotate on said shaft and coaxial therewith, a pinion carried by said second element, a gear meshing with said pinion, said gear being mounted on a suitable support, a second gear having a different number of teeth carried thereby, and meshing with the opposite side of the rack, whereby said elements are rotated at different speeds.

In testimony whereof I affix my signature.

DEMETRIOS KARAMANOS.